(12) United States Patent
Campbell et al.

(10) Patent No.: US 8,267,601 B2
(45) Date of Patent: Sep. 18, 2012

(54) PLATFORM FOR STEREOSCOPY FOR HAND-HELD FILM/VIDEO CAMERA STABILIZERS

(75) Inventors: Patrick Campbell, Stevenson Ranch, CA (US); Vince Pace, Shadow Hills, CA (US); James Cameron, Malibu, CA (US)

(73) Assignees: James Cameron, Burbank, CA (US); Vincent Pace, Burbank, CA (US)

( * ) Notice: Subject to any disclaimer, the term of this patent is extended or adjusted under 35 U.S.C. 154(b) by 775 days.

(21) Appl. No.: 12/264,876

(22) Filed: Nov. 4, 2008

(65) Prior Publication Data

US 2010/0110204 A1 May 6, 2010

(51) Int. Cl.
*G03B 17/00* (2006.01)
(52) U.S. Cl. ........ 396/428; 348/376; 396/419; 396/420; 396/421; 396/422; 396/423; 396/424; 396/425; 396/426; 396/427
(58) Field of Classification Search .................. 348/376; 396/419–428; 248/181.1
See application file for complete search history.

(56) References Cited

U.S. PATENT DOCUMENTS

| | | | |
|---|---|---|---|
| 4,017,168 A | 4/1977 | Brown | |
| 4,158,490 A | 6/1979 | Gottschalk et al. | |
| 4,208,028 A | 6/1980 | Brown | |
| 4,474,439 A * | 10/1984 | Brown | 352/243 |
| 4,650,305 A * | 3/1987 | Hines | 396/325 |
| 5,360,196 A | 11/1994 | DiGiulio et al. | |
| D358,832 S * | 5/1995 | Lenney et al. | D16/242 |
| 5,579,071 A | 11/1996 | Wetzel | |
| 5,737,657 A | 4/1998 | Paddock et al. | |
| 5,746,404 A * | 5/1998 | Merko | 248/123.11 |
| 5,784,966 A * | 7/1998 | Brown et al. | 104/304 |
| 6,578,967 B1 | 6/2003 | Paddock et al. | |
| 6,701,081 B1 * | 3/2004 | Dwyer et al. | 396/329 |
| 6,905,264 B2 | 6/2005 | McKay | |
| 6,916,124 B1 | 7/2005 | Correira | |
| 7,059,783 B1 * | 6/2006 | Wesselink et al. | 396/427 |
| 7,244,070 B2 | 7/2007 | Burnett et al. | |
| 7,372,502 B2 | 5/2008 | Gonzalez | |
| 7,643,748 B2 * | 1/2010 | Cameron et al. | 396/325 |
| 7,681,846 B1 * | 3/2010 | Mijailovic | 248/181.1 |
| 7,848,635 B2 * | 12/2010 | Routhier | 396/325 |
| 2003/0210328 A1 * | 11/2003 | Mazzilli | 348/148 |
| 2005/0196163 A1 * | 9/2005 | Mootz et al. | 396/428 |

(Continued)

OTHER PUBLICATIONS

PACE, "PACE, Revolutionize the Experience, The Fusion 3D SteadiCam AutoBalance," Undated.

(Continued)

*Primary Examiner* — Chieh M Fan
*Assistant Examiner* — Antoinette Spinks
(74) *Attorney, Agent, or Firm* — SoCal IP Law Group LLP; John E. Gunther; Steven C. Sereboff

(57) ABSTRACT

To compensate for changes in weight distribution of transportable, hand-held camera supports when one or both camera translate or pivot in a two-camera stereographic imaging system, the bottom of the elongated camera support attaches to a compensation mechanism. The mechanism has a balance plate movable laterally on a bottom housing. Ballast mounts below the bottom housing. A motor in the bottom housing moves the balance plate and the pole laterally in response to camera pivoting or lateral movement to maintain the center of gravity of the system centered along the longitudinal axis of the elongated support.

5 Claims, 12 Drawing Sheets

U.S. PATENT DOCUMENTS

| | | | | |
|---|---|---|---|---|
| 2006/0120714 | A1* | 6/2006 | Wesselink et al. | 396/427 |
| 2006/0263082 | A1* | 11/2006 | Brown | 396/421 |
| 2006/0273227 | A1 | 12/2006 | Smith | |
| 2007/0050139 | A1 | 3/2007 | Sidman | |
| 2008/0211905 | A1* | 9/2008 | Wesselink et al. | 348/143 |
| 2009/0296212 | A1* | 12/2009 | Routhier | 359/477 |

OTHER PUBLICATIONS

The Tiffen Company, "The New Steadicam Clipper 312 & 324 Camera Stabilizing Systems," Sales Brochure. www.tiffen.com, undated, 4pp.

The Tiffen Company, "Steadicam—Flyer LE Camera Stabilizing System," Sales Brochure. www.tiffen.com, undated, 4pp.

The Tiffen Company, "Steadicam Merlin Arm and Vest, A new breakthrough in camcorder stabilization," Sales Brochure. www.tiffen.com, undated, 4pp.

The Tiffen Company, "Steadicam Ultra$^2$, The New Steadicam Ultra$^2$," Sales Brochure. www.tiffen.com, undated, 4pp.

Wikipedia, "Steadicam," Definition, avail http://en.wikipedia.org/wiki/steady_cam, printed Oct. 1, 2008, 4pp.

* cited by examiner

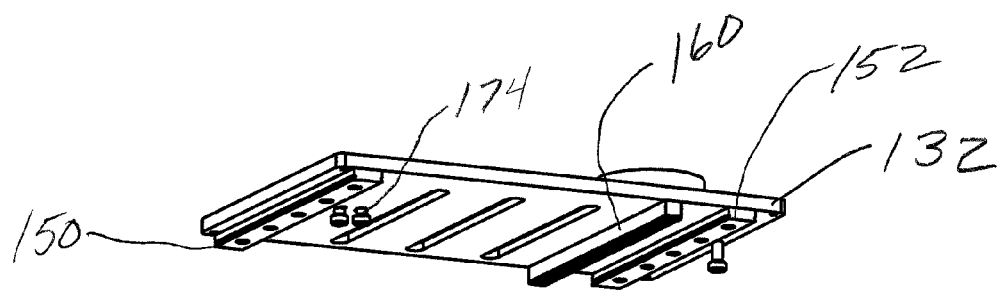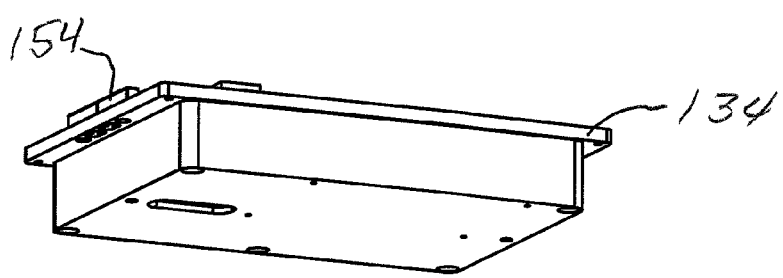
FIG. 8

PLATFORM FOR STEREOSCOPY FOR HAND-HELD FILM/VIDEO CAMERA STABILIZERS

BACKGROUND

1. Field

This disclosure relates to a platform for stereoscopy using hand held film/video camera stabilizers.

2. General Background and State of the Art

Humans (and many animals) use binocular vision to view the environment in three dimensions. Binocular vision is both a visual and an analytical system. The brain perceives distance and speed based, in part, on triangulating visual information that the retinas of the laterally separated, forward facing eyes receive. Because both eyes face forward and are about 6½ cm-7 cm (2½ in.-3 in.) apart, their respective fields of view overlap, with each eye perceiving a slightly different perspective of the same area. Focusing on objects closer to our eyes, causes the eyes to rotate towards each other. Focusing on more distant objects cause the eyes to rotate towards a more parallel view. The angle between the lines of sight of each eye is commonly termed the convergence angle. The convergence angle is considered higher when viewing closer objects and lower when viewing distance objects. The convergence angle may be essentially zero, indicating essentially parallel lines of sight, when viewing objects at great distance. The eyes also change focus when changing between viewing distant and near objects. The brain process information about the convergence angle (binocular) and focus (monocular) to perceive distance and velocity Three-dimensional imaging, also known as stereographic imaging, dates at least as far back as 1838. Historically, stereographic cameras commonly include two lenses spaced laterally apart a similar distance as an average human's eyes, approximately 6½ cm-7 cm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing decreases the apparent depth of a stereographic image.

To perceive images in three dimensions, a first image to be seen only by the left eye and a second image to be seen only by the right eye are projected on a screen or monitor. Differences, or disparity, between the two images may provide an illusion of depth so that the two images having disparity may be perceived as three-dimensional.

Viewers may not perceive two images or portions of two images exhibiting excessive disparity as three-dimensional but simply as two overlapping two-dimensional images. The amount of disparity that a viewer can accommodate, commonly called the disparity limit, varies among viewers. The disparity limit is also known to vary with image content, such as the size of an object, the proximity of objects within an image, the color of objects, and the rate of motion of objects within the image. The disparity limit, expressed as the angle between the lines of sight of the viewer's eyes, may be about 12-15 minutes of arc for typical stereoscopic images.

A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of a second polarization state. Stereoscopic displays of this type typically project the two polarized images onto a common projection screen. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Two cameras or other image acquisition devices are required to capture the left and right images. Examples of image acquisition devices include charged coupled devices (CCD), complementary metal-oxide semiconductor (CMOS) devices, film and other devices. Image acquisition devices may acquire visual information singly or in sequence. The image acquisition devices are part of more complex cameras that include a lens, control circuitry, image storage (on or off the camera) and other structure for using the camera. The lens can focus, zoom and change aperture (f-stop) usually under control of electronically controlled motors.

The two cameras can mount next to each other. application Ser. No. 11/422,048, filed Jun. 2, 2006, now U.S. Pat. No. 7,643,748 B2, discloses a platform for mounting two adjacent cameras on separate convergence plates. The application is incorporated by reference. Rotating or displacing the convergence plates changes the angle of the cameras relative to each other and can more the cameras toward or away from each other. For example, when each convergence plate is rotated in a direction moving the front (lens) of each camera toward each other, the angle of convergence increases. The resulting effect is one of shifting stereoscopic depth of field from a more distant to a closer position. Pivoting each convergence plate in the opposite direction produces the opposite effect.

Pivoting both plates may be unnecessary because pivoting one plate changes the convergence angle.

The convergence plates also can move relative to each other with or without a corresponding pivoting. Moving one plate away from the other plate increases the interocular distance between the cameras' image acquisition devices. The greater interocular distance increases the stereoscopic depth of field. People do not see stereoscopically beyond about 20 ft. (6 m). For example, people attending a basketball game are usually too far from play to view the action stereoscopically. However, a video creator may want a stereoscopic effect from the more distant action. Increasing the interocular distance can yield stereoscopic effect for more distant action. Choosing the interocular distance and convergence angles are often creative and artistic choices.

Camera lenses usually have a wider diameter than a human eye has. Even with the lenses touching each other, the axes of the lenses may be farther apart than human eye spacing. For natural stereoscopic viewing, having to the lens spacing approximately equal to human eye spacing (6½-7 cm) can be important. To overcome this potential problem, the two cameras can be mounted spaced and perpendicular to each other. Images enter one camera through a half-silvered mirror, and the other images reflect from the mirror to the other camera. Because the cameras are spaced apart in perpendicular planes, their lenses do not contact each other. Consequently, distance between the lenses' axes can be zero or at any desired spacing subject to the dimensions of the platform.

A Steadicam®, which is sold by The Tiffen Co. of Hauppauge, N.Y., is one of several models of similar camera support devices. They allow camera operators to support a camera and move while filming scene. See for example, Brown, U.S. Pat. No. 4,474,439 (1984). Using the word "filming" does not imply that photographic film is used. The word applies to all types of image capture. A Steadicam comprises a sled pole with camera (here two cameras) mounted on the upper portion of the pole and a ballast mounted at the lower end of the pole. The ballast may include batteries for supplying electrical power to the camera and other equipment. The camera/ballast positions can be reversed for recording from low, near-the-ground positions. A monitor also may mount on the pole at a convenient viewing position and angle for the operator. The weight distribution increases the systems moment of inertia to maintain the camera steady and eliminate or minimize small camera movements.

To allow the operator to move the camera vertically, the sled pole connects to a support arm such as that shown in U.S. Pat. No. 4,208,028 (1980) and U.S. Pat. No. 5,360,196 (1994). They teach linkages with pairs of arm sections forming parallelograms, each with a link on the operator end and a link on the pole end. The linkage maintains the pole vertical as the pole moves vertically. Springs on the linkage compensate for the weight of the pole and its equipment. With cameras, ballast, monitor and other equipment, the camera support can be quite heavy. Moreover, the linkage isolates the pole and equipment from the operator to limit transmission of his or her vertical movements during walking or running to the camera. This is sometimes called "buoyancy."

The pole has a gimbal mount positioned at the center of gravity of the pole and the equipment mounted on the pole. The gimbal attaches to a support garment worn by the operator directly or indirectly through the linkage. The gimbal is fixed at a vertical positioned along the pole to be at the center of gravity. Insofar as the weight of the camera(s) and their support structure may not be along the axis of the pole, the ballast and other equipment may be positioned toward or away from the pole to locate the center of gravity along the pole. Likewise, the ballast and other equipment may have to be positioned relative to each other for similar reasons. This is especially true because any monitor may have to be positioned so the operator can have a clear view of it.

As the camera operator walks or runs through the scene, he or she steers or guides the camera through the scene. The gimbal mount allows the cameras to pivot forward and back, side to side and in between.

Before filming each scene begins (i.e., before each "take"), the operator starts with the camera support balanced about the center of gravity at the gimbal such that there is no force tending to rotate the pole about the center of gravity.

With non-stereoscopic filming, the system's weight distribution remains constant. However, during stereoscopic filming, one or both cameras may move laterally to change interocular displacement or may pivot to change the convergence angle. Even small movement change the center of gravity of the system. When that occurs, the operator must try to overcome the changing weight distribution and force the pole back to vertical while still guiding the camera during filming. This is difficult for the operator. For larger camera lateral movements or changes in convergence angles, the operator may be unable to compensate for the change in weight distribution.

Even when filming a one-dimensional scene, preventing the camera from tilting is important so that objects will not lean when the image is projected. Preventing tilting of two-camera stereoscopic is important to maintain the stereoscopic effect.

BRIEF DESCRIPTION OF THE DRAWINGS

FIG. 8 is another exploded, perspective view of the compensating platform.

Figure 1:
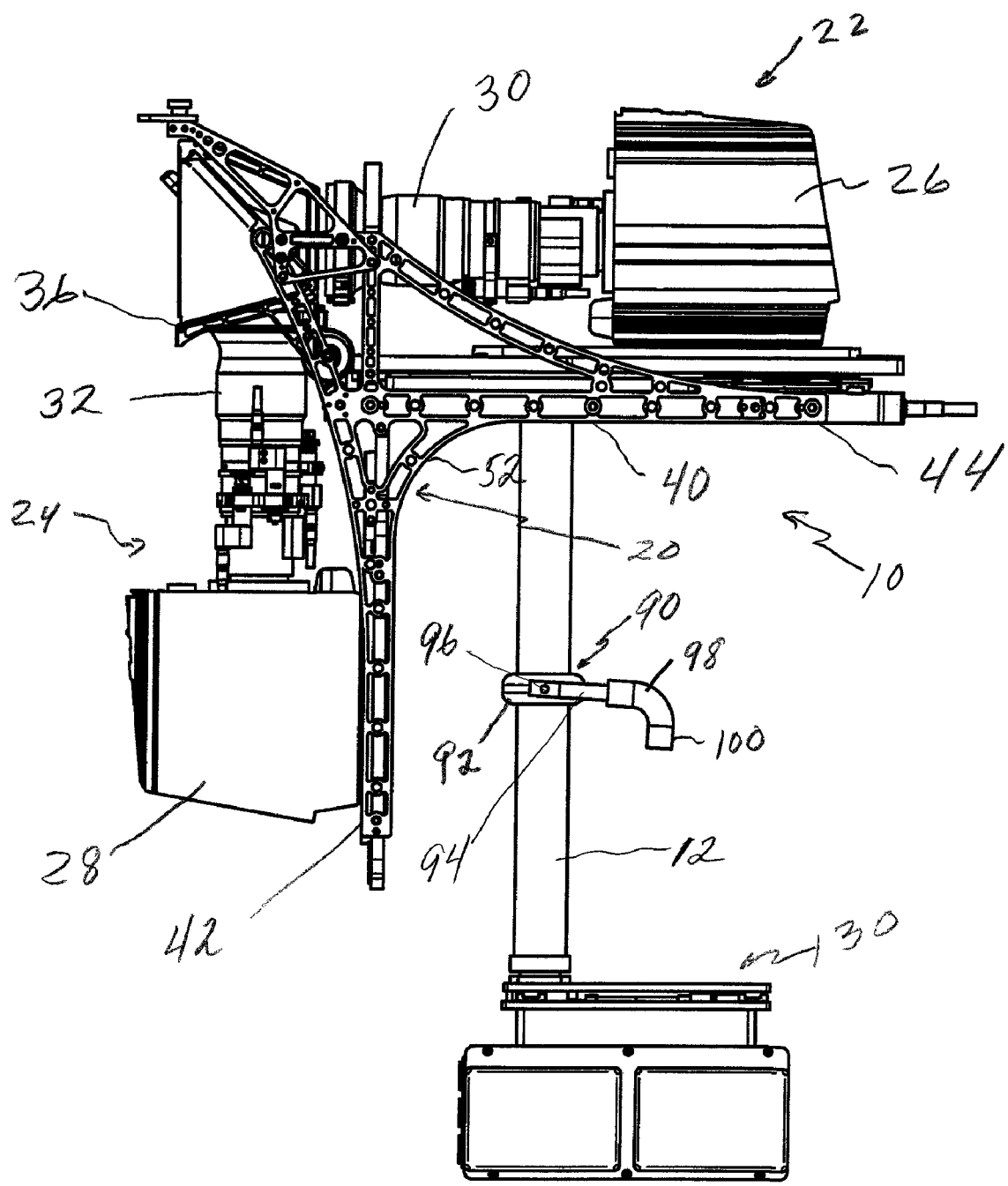
FIG. 1 is a side view of an exemplary embodiment of the camera hand-held transport system having a compensating platform, camera support and cameras mounted on the support.

Throughout the following detailed description, elements appear in more than one drawing, but the drawings do not always repeat every reference numeral in every figure.

SUMMARY

The present system compensates for changes in weight distribution of transportable, hand-held camera supports in a two-camera, stereographic imaging system. During filming when one or both cameras translate or pivot to change the convergence angle or interocular distance, the center of gravity of the system changes. The camera support has a pole with the camera mounted on top and ballast mounted at the bottom. The bottom of the pole attaches to a compensation mechanism that has a balance plate movable laterally on a bottom housing. The ballast is below the bottom housing. A motor in the bottom housing moves the balance plate and the pole laterally in response to camera pivoting or lateral movement to maintain the center of gravity of the system centered along the longitudinal axis of the pole.

DETAILED DESCRIPTION OF THE EXEMPLARY EMBODIMENTS

Convergence and interocular movements of the one or both cameras of stereoscopic camera systems affect the balance of portable camera supports such as Steadicams. The convergence and interocular movements of the camera shift the weight of the system and these can be counteracted by moving either the ballast below the camera or by moving the entire camera itself.

The system compensates for changes in weight distribution of a portable camera transport. In the exemplary embodiment, portable, hand-held transport system 10 includes an upright support in the form of an elongated pole 12 having a longitudinal axis. The pole is tubular and cylindrical in the exemplary embodiment for high strength and low weight. The pole could be solid and have a polygonal cross-section, however. Other upright supports could be used, but cylindrical poles are the most common shape for the upright support of Stedicams.

A camera support mounts to one end of the elongated pole. In the exemplary embodiment, the camera support 20 mounts to the top of pole 12. In the FIGS. 1-3 embodiments, camera support 20 mounts two cameras, horizontal camera 22 and vertical camera 24, orthogonally A beam splitter in the form of half-slivered mirror 34 (FIG. 2) mounts at a 45° angle to light from an object being imaged. The mirror partially reflects the image to camera 24 and partially transmits the image to camera 22. Hines U.S. Pat. No. 4,650,305 (1987) is an example of orthogonally mounted cameras behind a half-slivered mirror.

The half-silvered mirror mounts within mirror housing 36 at the front end of camera support 20. The mirror housing has sidewalls surrounding the beam splitter to block light from the sun, film lights or other background light from the beam splitter. Additional baffles such as baffle 38 may mount on the front periphery of the mirror housing or cameral support. These baffles can pivot or move to positions blocking addition light from reaching the beam splitter.

Each camera 22 and 24 include a camera body 26 and 28 respectively. The body houses an image receiver (not shown) such as a CCD, CMOS or other electronic or non-electronic image receiver. Each camera may include electronic controls for controlling image processing such as light levels, color control, contrast and other image attributes.

Many cameras have built-in monitors, but one or more separate monitors can mount on the transport system (not shown) or be located at a remote panel or control room. Signals from the camera transmit to the monitor through wires or wirelessly. Monitors for view what the camera record in the exemplary system are located remotely for a cinematographer or technician.

Each camera has a lens 30, 32. Three motors (not shown) control each lens for focus, aperture (f-stop) and zoom. Though manual control of these properties are possible, they are not practical in stereoscopy because the focus, aperture and zoom for both cameras normally will be the same because they are imaging the same objects, and adjusting both lenses separately likely will cause at least slight differences in focus, aperture or zoom.

Figure 2:
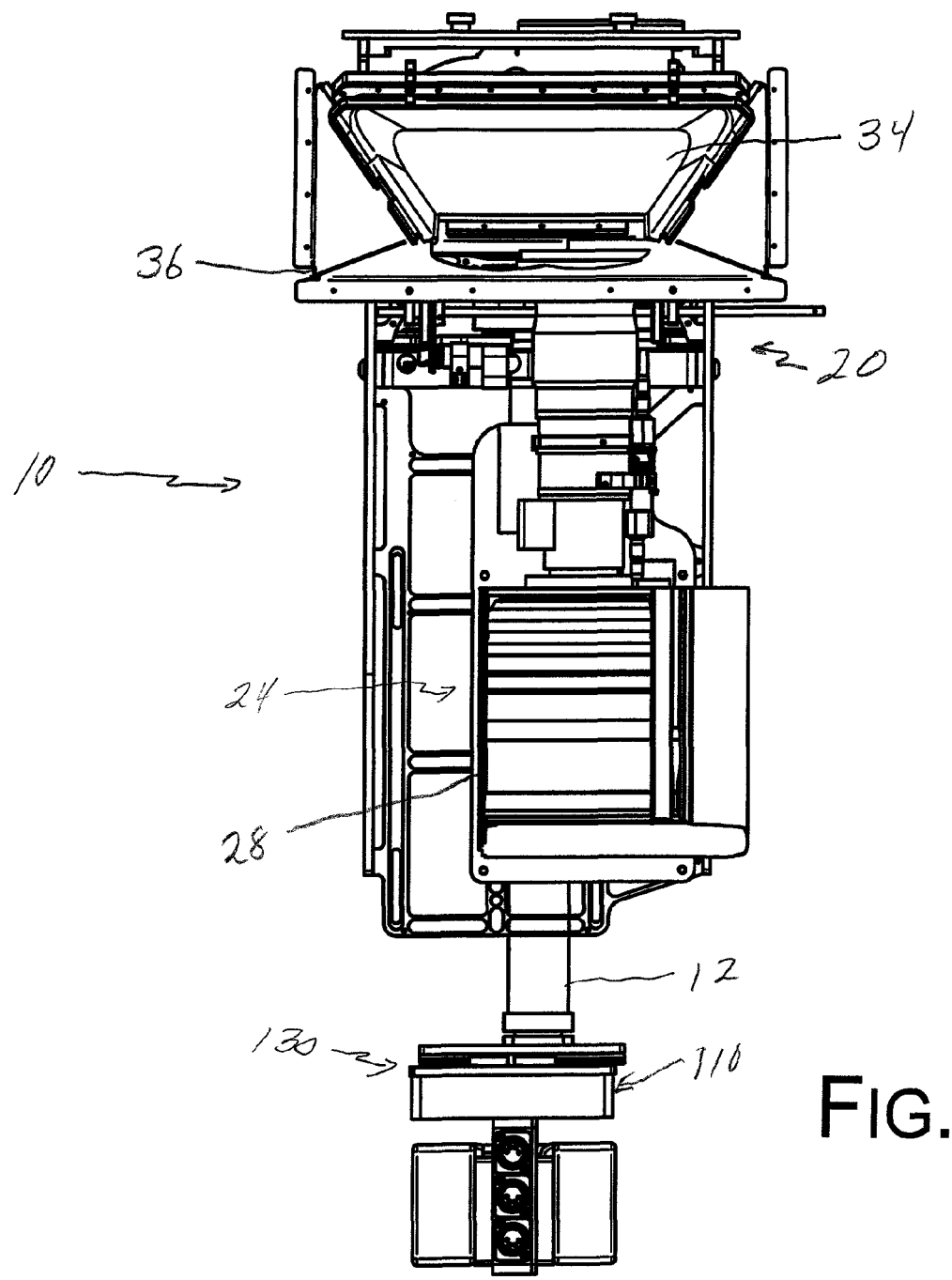
FIG. 2 is a front view of an exemplary embodiment of the camera hand-held transport system having a compensating platform, camera support and cameras mounted on the support.

Stereoscopic cameras can mount adjacent each other for stereoscopic imaging. They mount at a 90° angle to each other in the exemplary embodiment to separate the cameras and their lenses physically. Physical separation allows positioning the cameras' optical axes as close to each other as desired for the chosen convergence and interocular distance. As FIG. 1 shows, the front end of the lenses 30 and 32 do not contact each other.

Figure 3:
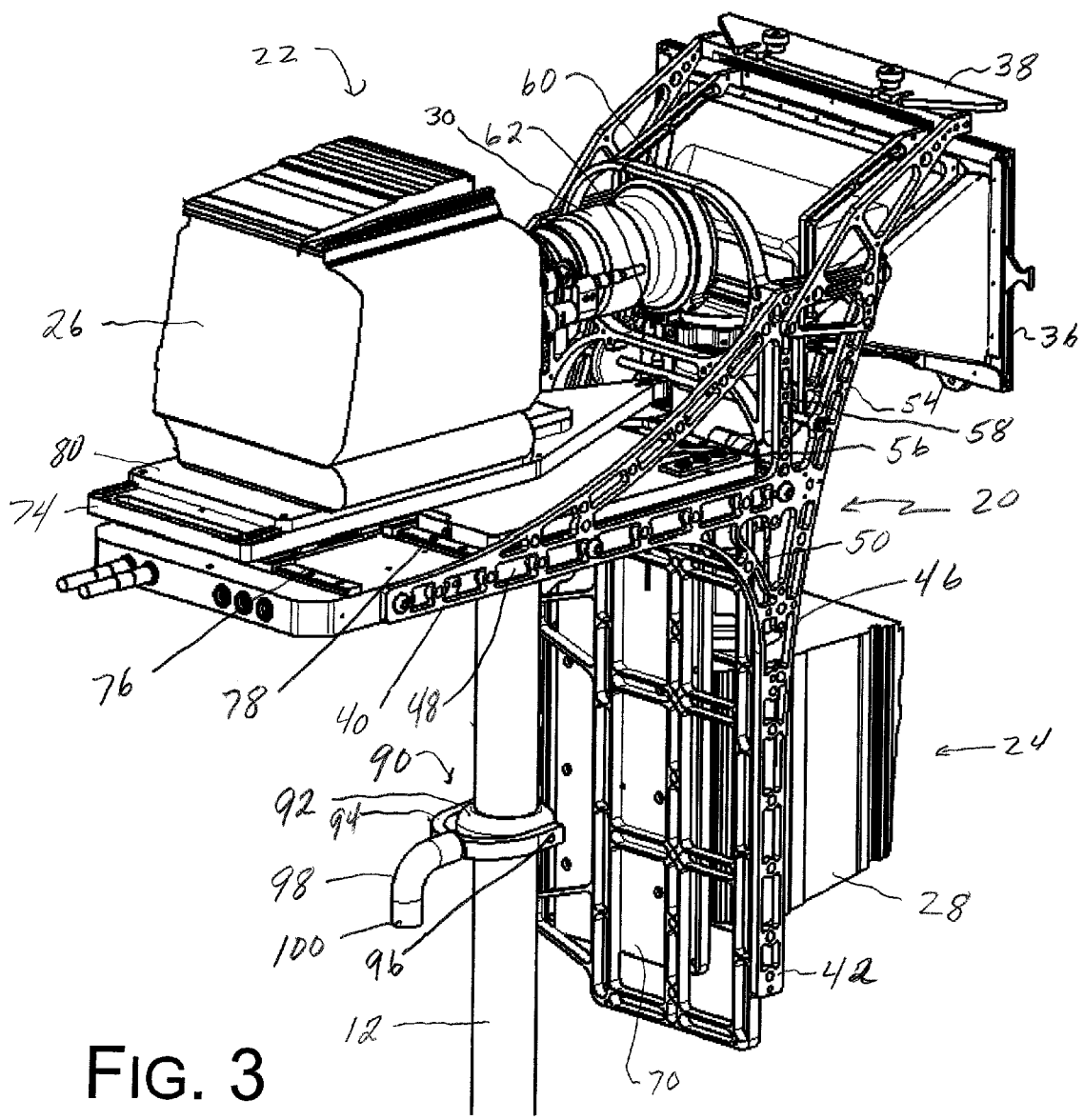
FIG. 3 is a perspective view of the upper portion of an exemplary embodiment of the camera hand-held transport system showing details in the camera support and the mounting of cameras.

Exemplary camera support 20 includes a horizontal support section 40 and a vertical support section 42 mounted perpendicularly. The supports are formed of rails such as rails 44 and 46 (FIGS. 1 and 3). The rails have cutouts such as cutout 48 to decrease weight. If desired, switches or other related devices can mount in the cutout or attach to the rail at the cutout. Cables also can pass through the cutouts. Braces 50 and 52, which are curved in the exemplary embodiment, connect the horizontal and vertical supports 40 and 42 to buttress the supports. Other braces 54, 56 and 58 (FIG. 1) extend from horizontal support 40 to connect to the mirror housing 36. Additional internal bracing such as curved braces 60 and 62 (FIG. 3) help secure the various parts of the camera support 20. In addition, supports may be provided to prop up long, heavy lenses. Other braces and structure shown in the drawings is not described in detail but suggest to those of ordinary skill possible locations and orientations for braces and other structure.

The drawings do not show the conventional connection of pole 12 to camera support 20. A cup-shaped fitting mounts on the support and receives the top of the pole. The fitting has bolts or other fasteners to secure the pole and fitting. Threaded or bayonet connections also can attach the pole to the camera support. Likewise, other known fittings used to attach poles and other elongated members to plates also could be used. In addition, braces could connect horizontal support 40 and a vertical support 42 to the pole, but they are not used in the exemplary embodiment.

In the exemplary embodiment, camera 24 mounts to support 20 in a fixed, lateral position with the lens pointing upward, parallel with pole 12. Camera body 28 attaches to plate 70 (FIG. 3), and the plate attaches to vertical support 42. The plate/camera mount can permit vertical positioning to move the camera forward and back along the optical axis. That distance might be changed when using different length lenses. Normally, the imaging device at the focal planes of both cameras 22 and 24 are equidistant from the beam splitter, and lenses 30 and 32 have the same focal length. If they are zoom lenses, they are set to the same focal length initially. If they zoom during a scene, the motors controlling the zoom will change the lenses' focal lengths together.

Camera body 26 of the horizontal camera 22 mounts on horizontal support plate 74. The plate mounts on rails 76 and 78 (FIG. 3). Support plate 74 includes a sliding plate 80 that can slide forward and back along the support plate. The sliding plate is secured in place to adjust the initial forward and back position of camera 22 SO that both cameras' focal planes are the same distance from the beam splitter.

Support plate 74 moves laterally and pivots to change the interocular distance and the convergence angle. A first stepper motor (not visible) moves support plate 74 laterally on rails 76 and 78 to adjust the interocular distance relative to the vertically mounted camera 24. A second stepper motor (also not shown) pivots the support plate or camera to change the convergence angle. The structure permitting the pivoting is not shown.

Gimbal 90 mounts on the pole. See FIGS. 1 and 3-6. The gimbal has a ring 92 that has an inside diameter slightly larger than the outside diameter of pole 12. Fasteners (not shown) secure the gimbal ring to the pole. Pins 96 attach a U-shaped bracket or yoke 94 to the ring. A bracket 98 extends toward the rear of the gimbal. The bracket has a vertical section 100 projecting downward that engages a vest worn by the operator. The bracket can connect directly to the vest, or the bracket may attach to a spring-loaded linkage (not shown), which attaches to the vest. Some gimbals permit the structure supported on the gimbal to move front to back and side to side. The exemplary embodiment only permits front to back pivoting.

Gimbal 90 is positioned vertically on pole 12 at the center of gravity of the fully loaded system. The gimbal allows the pole to move up and down while the pole remains in a vertical orientation.

The bottom of pole 12 connects to the weight compensation platform 130. FIGS. 1, 2, 4, 5 and 6. The platform is discussed in more detail below. Ballast 110 mounts below the weight compensation platform. The ballast comprises battery 112 and attached counterweights 114, 116, 118 and 120 (best seen in FIG. 4). Housing 122 for the batteries has fasteners (not shown) for attaching the counterweights. Those fasteners could allow the batteries to be positioned forward or backward to adjust the system's balance. Electrical outlets 124 on the battery housing allow electric leads to transmit power to devices (cameras, motors, monitor, wireless transmitter, etc.) mounted on the system.

A director or cinematographer wanting particular effects may want the camera mounted near the ground or floor. If so, mounting the camera at the bottom of the pole and mounting the batteries and other ballast at the top of the pole may be desirable.

The system is balanced when the gimbal is positioned properly and the cameras, their mounting structure, the mirror and its housing, the ballast and any other devices exert no forward and back or side-to-side forces. If the system is out of balance, the ballast or camera support is moved slightly. In addition, the user could position weights on the camera supports or ballast. The weight compensation platform 130 of the exemplary embodiment has structure that permits balancing as discussed below.

When filming begins, the camera operator carries the transport system into the scene. The cinematographer or technician monitoring filming may change the interocular distance or convergence angle as the system moves toward or away from objects in the scene. Those changes require lateral movement or pivoting of horizontally mounted camera 22, which affect the system's balance about the center of gravity.

The system compensates for changes in the center of gravity by repositioning the pole relative to other structure. That weight compensation mechanism of the exemplary embodiment includes weight compensation platform 130 (see particularly FIGS. 4 and 7-10). Platform 130 includes balance plate 132, which mounts on balance housing 134. Pole 12 attaches to balance plate 132. Though the drawings show balance plate 132 above balance housing 134, the housing could be above the plate at the top of the pole.

Figure 4:
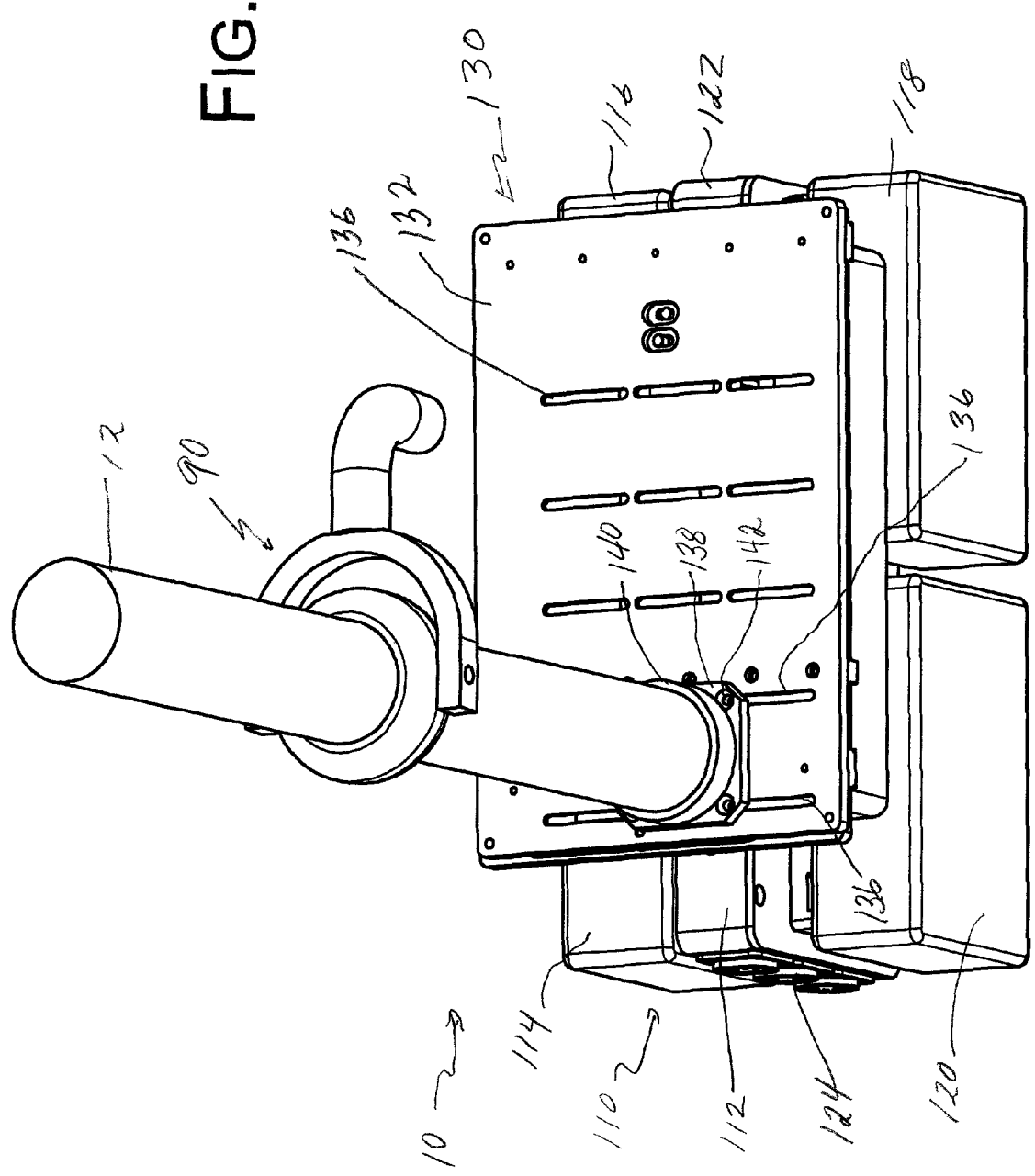
FIG. 4 is a perspective view of the lower part of the camera hand-held transport system having a compensating platform.
Figure 5:
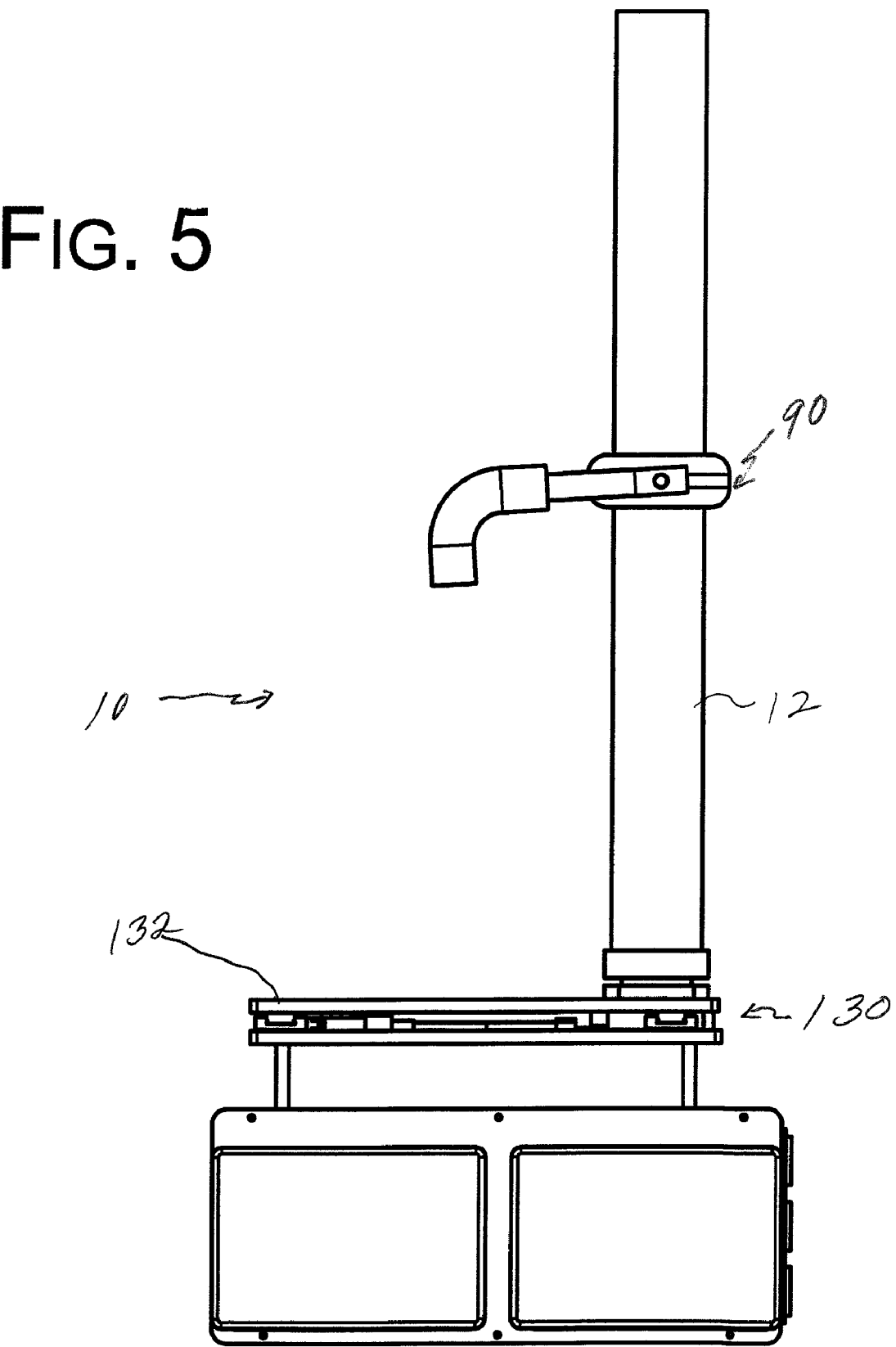
FIG. 5 is a side view of the lower part of the camera hand-held transport system.
Figure 6:
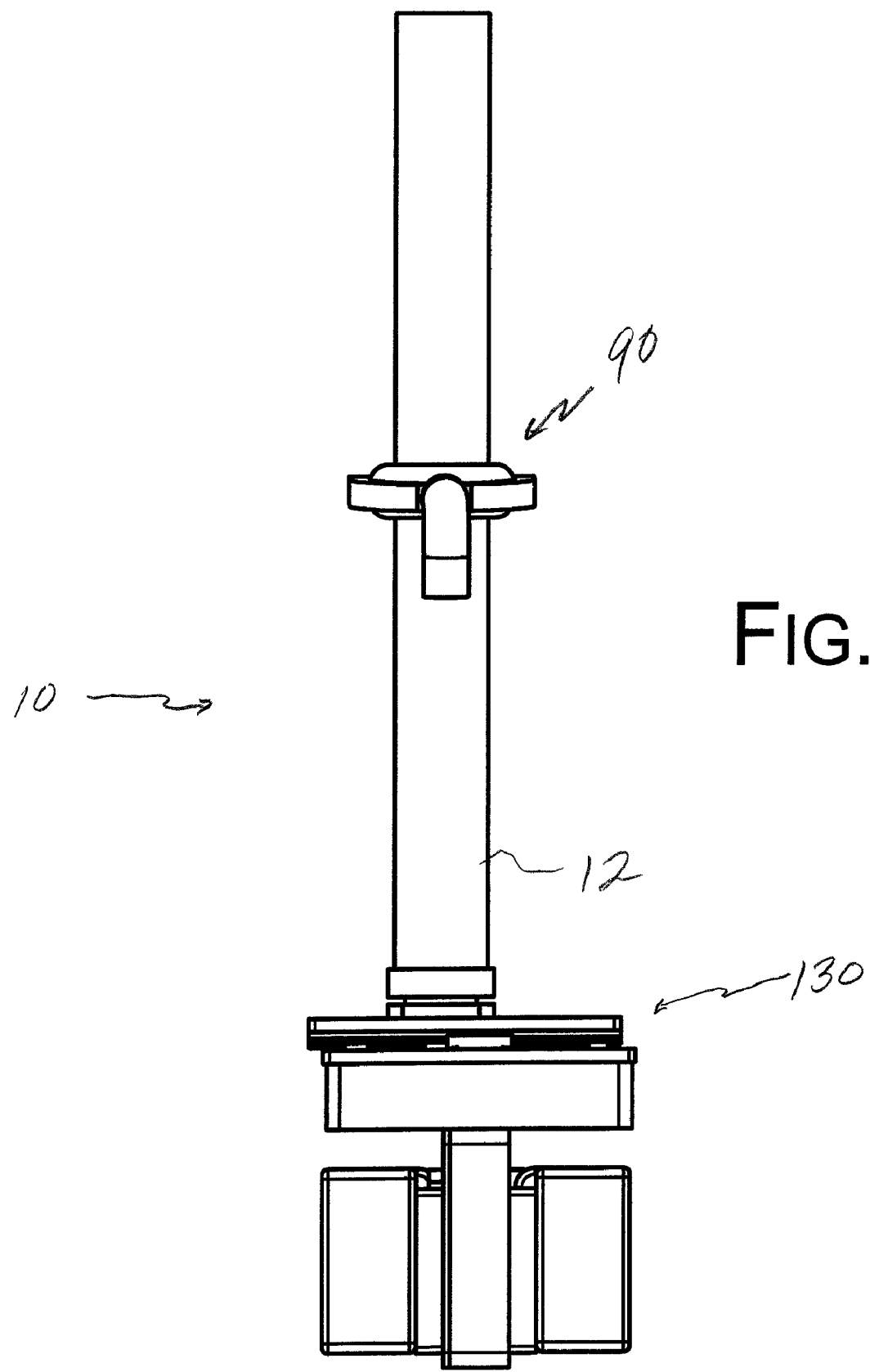
FIG. 6 is a front view of the lower part of the camera hand-held transport system.

The balance plate has an array of lateral grooves 136. Fitting 138 attaches to the balance plate at the grooves (FIG. 4). The fitting has a cylindrical cup 140 that receives the bottom of the pole. A locking mechanism (not shown) such as set screws, secures the pole to the cup. The bottom of the pole also could be threaded or have a bayonet fitting that mates with complimentary structure in the cup. Bolts 142 secure the fitting through the lateral grooves to the balance plate. The balance plate 132 rides above and moves laterally relative to balance housing 134.

The multiple grooves allow a rough balancing of the system. More precise balancing is discussed below. Fitting 138 is attached to two sets of grooves 136 of the five sets of grooves in the exemplary embodiment for proper forward and backward balance (right and left in FIG. 4). The fitting is positioned along the chosen grooves until a rough lateral balance is achieved. Bolts 142 then are tightened to secure the fitting properly.

Two rails 150 and 152 seat in channeled, rail engaging fittings 154 and 156 (FIGS. 7-10) to secure balance plate 132 and bottom housing 134 of weight compensation platform 130 together and to allow lateral movement of the balance plate and bottom housing. The channeled fittings are shaped to receive corresponding structure on the rails such that the rails can slide in the channeled fittings but stay within the fittings unless they slide all the way out. For example, the rails can be a trapezoidal, and the fitting can have corresponding, mating structure. The rails also could have a tongue received in a groove in the fitting.

Figure 7:
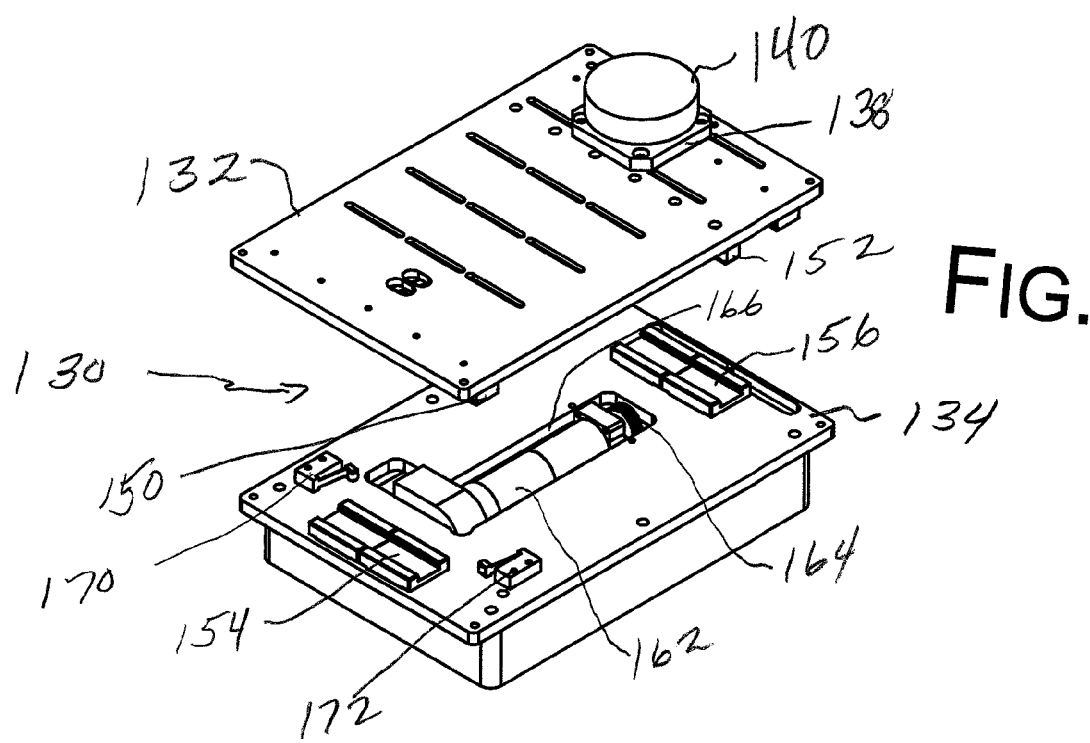
FIG. 7 is an exploded, perspective view of the compensating platform.
Figure 9:
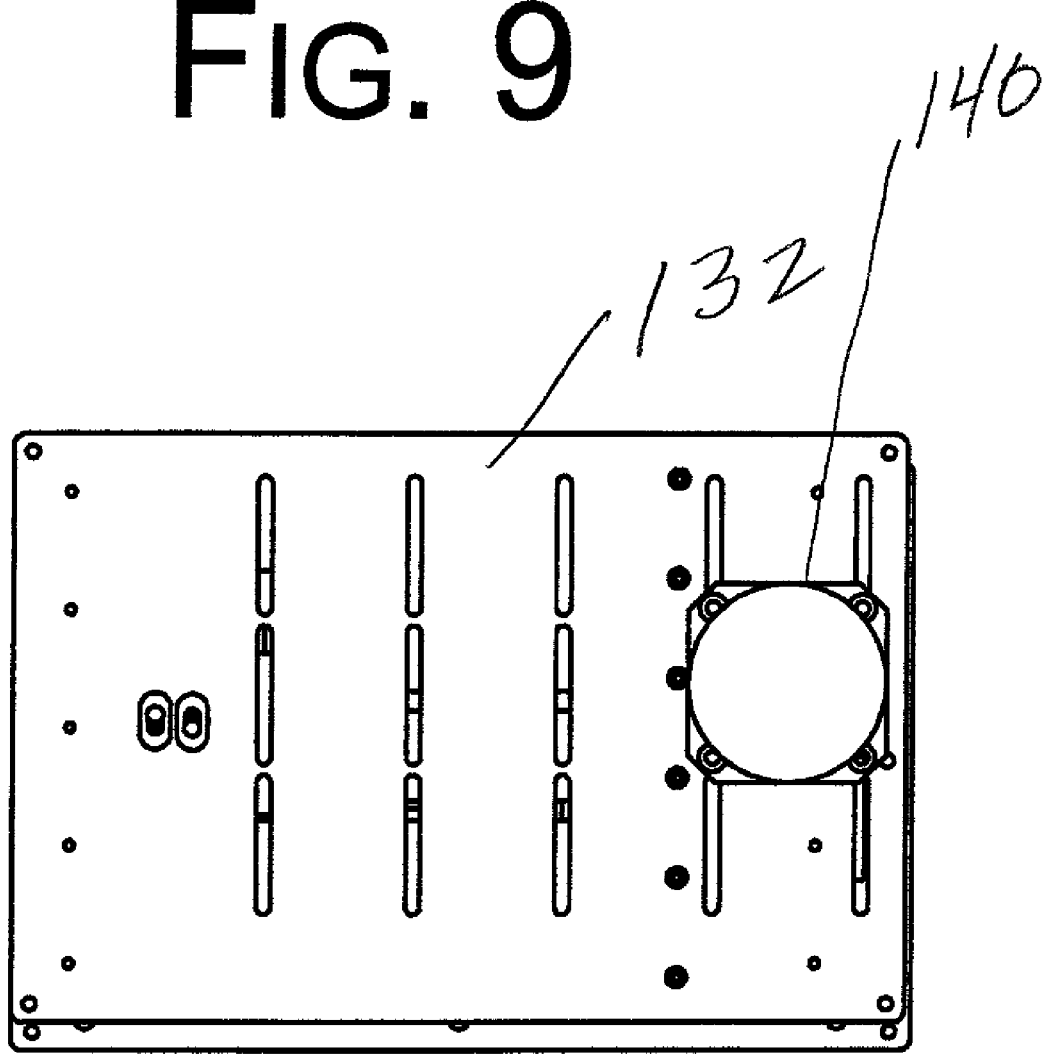
FIG. 9 is a plan view of the top part of the compensating platform.
Figure 10:
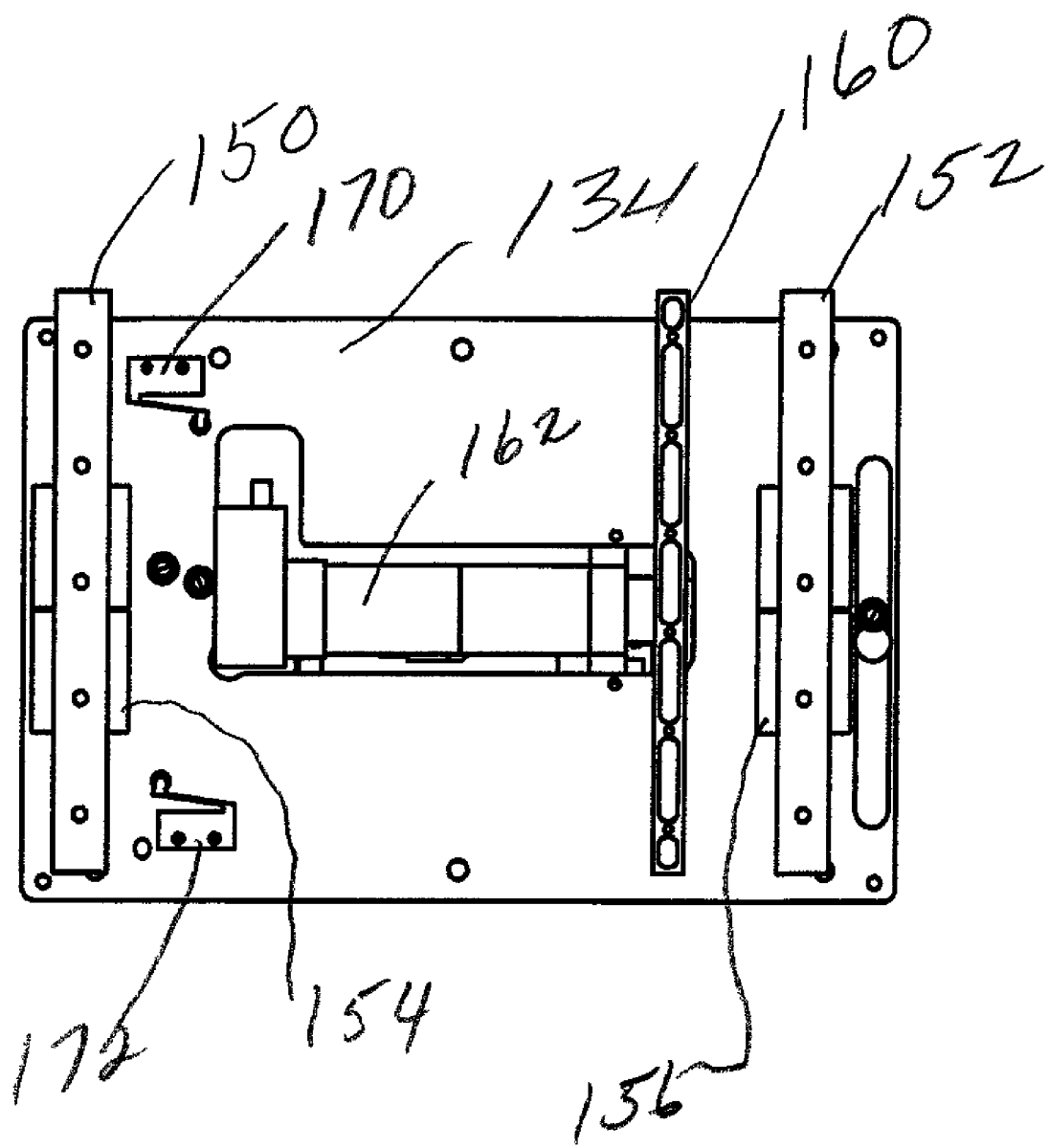
FIG. 10 is a plan view of the bottom part of the compensating platform.
Figure 11:
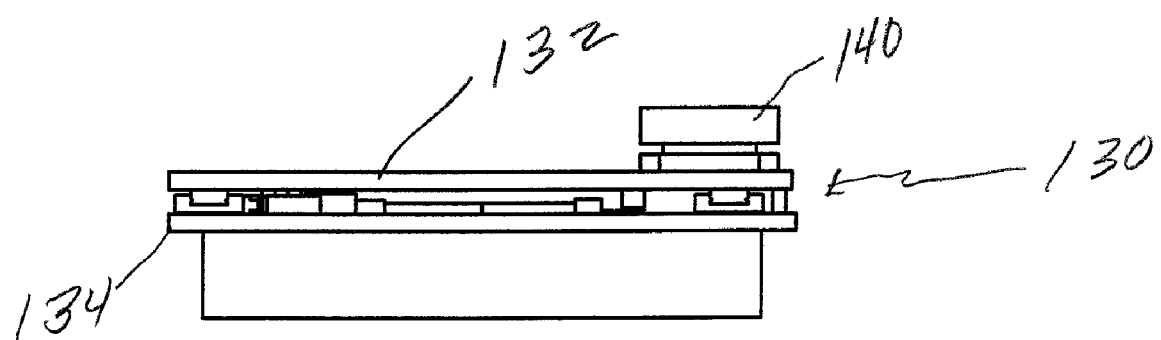
FIG. 11 is a side view of the compensating platform.

Balance plate 132 also has a drive bar 160 (FIGS. 8 and 10) that projects down from the bottom of balance plate 132. The bottom of the drive bar engages roller 164 of stepper motor 162 (FIGS. 7 and 8). The motor mounts in opening 166 in balance housing 134 (FIG. 7). The roller and drive bar have friction surfaces so that the motor's rotation acts to move the drive bar and the balance plate laterally relative to the balance housing. Instead of a friction roller, roller 164 could have a pinion engaging a corresponding rack on the drive bar.

A pair of limit switches 170 and 172 on balance housing 134 stops motor rotation when projecting pin 174 on the balance plate moves to its farthest lateral positions and engages a limit switch. FIG. 8.

Camera 22 moves linearly when adjusting the interocular distance and rotates when adjusting the convergence angle. When determining how far to move the balance plate 132 of the weight compensation platform 130 should move for particular camera movement, one should recognize that convergence angles change little, usually less than 4°. Therefore, those small angles can be treated as linear movements.

The balance plate 132 of the weight compensation platform 130 moves parallel in the same direction to the camera's interocular translation. The scale factor for movement depends on many factors including mass and center of gravity of camera, mass center of gravity of counterbalance, mass and center of gravity of non-moving parts, length of the pole (affecting distance of camera to counterbalance) and the position of gimbal on the pole. Instead of trying to measure or calculate the compensation scale factor based upon these many factors, the system relies upon calibration using linear interpolation.

Control System and Balance Calibration: Once the system is balanced for each set up of cameras, supports, ballast, cables, computer control can control the relative positions of the balance plate 132 and balance housing 134. Alternatively, manual control could also adjust the relative positions.

The stereoscopic system has two motor positions driving the interocular distance and the convergence angle. Those positions are defined as follows:

$X_1$=Convergence motor position
$X_2$=Interocular motor position

These positions are represented as raw motor values. Each motor has an incremental encoder that is used for determining the motor's position. The exemplary embodiment use 512 counts/revolution×4 (because it uses quadrature decoding) and the gear head has a ratio of 78:1.

The mechanism for moving balance plate 132 is identical or very similar to the mechanism for translating and pivoting the camera. The two motor positions are constantly being updated and independent from each other. The position of motor 162 for balancing the system is to be determined by the using linear interpolation and the familiar equation below.

$$Y = mX + b \tag{1}$$

Looking only at the equation for convergence angle and ignoring interocular displacement yields the following equation:

$$Y_1 = m_1 X_1 + b_1 \tag{2}$$

Where $Y_1$=balance motor position based on convergence angle
$m_1$=Convergence Factor
$X_1$=Convergence Motor Position
$b_1$=Offset 1

For the interocular motor:

$$Y_2 = m_2 X_2 + b_2 \tag{3}$$

Where $Y_2$=balance motor position based on interocular distance
$m_2$=Interocular Factor
$x_2$=Interocular Motor Position
$b_2$=Offset 2

Adding these equations together, the equation for both convergence and interocular motors becomes $$Y_1 + Y_2 = m_1 X_1 + b_1 + m_2 X_2 + b_2 \quad (4)$$

Define $Y = Y_1 + Y_2$, and $b = b_1 + b_2$, the equation simplifies to:

$$Y = m_1 X_1 + m_2 X_2 + b \quad (5)$$

Where Y=Balance Motor Position
    $m_1$=Convergence Factor
    $m_2$=Interocular Factor
    $X_1$=Convergence Motor Position
    $X_2$=Interocular Motor Position
    b=Offset To use equation (5) to balance the system during recording, the values for $m_1$, $m_2$ and b must be determined. $m_1$, $m_2$ and b are constants for any specific configuration of the system. $m_1$, $m_2$ and b may vary with changes to the system such as redressing cables or changing the camera lenses.

Figure 12:
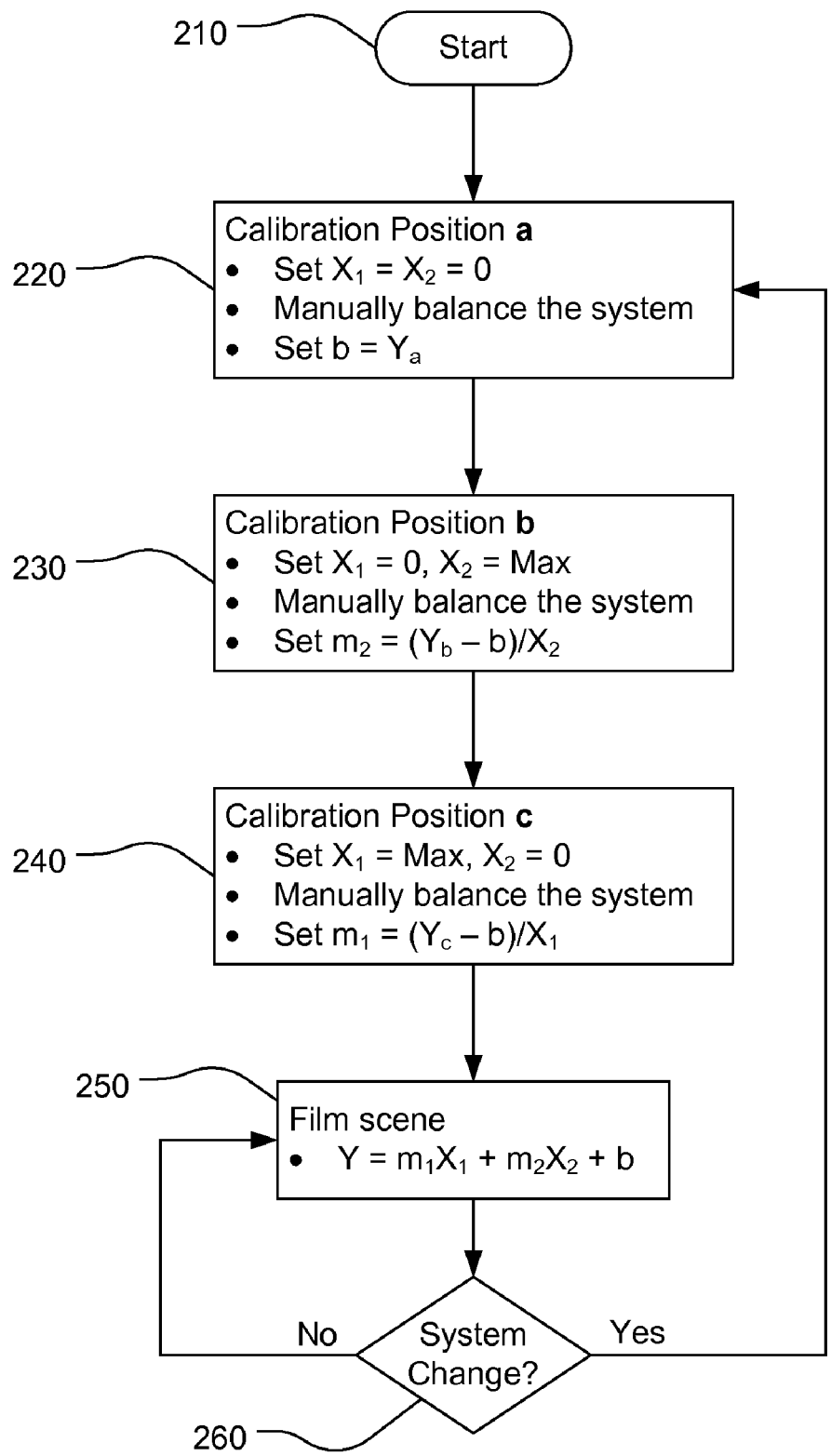
FIG. 12 is a block diagram showing the method of calibrating the compensation platform.

For any configuration of the system, $m_1$, $m_2$ and b may be determined using a calibration process. The system may be driven to three distinct calibration positions, a, b and c. At each position, the system may be balanced manually. $m_1$, $m_2$ and b may then be calculated by solving the following three equations:

$$Y_a = X_{1a} m_1 + X_{2a} m_2 + b;$$

$$Y_b = X_{1b} m_1 + X_{2b} m_2 + b;$$

$$Y_c = X_{1c} m_1 + X_{2c} m_2 + b;$$

where: $X_{1a}$, $X_{1a}$, $X_{1c}$=the position of the convergence motor at calibration positions a, b, and c, respectively;
    $X_{2a}$, $X_{2b}$, $X_{2c}$=the position of the interocular motor at calibration positions a, b, and c, respectively;
    $Y_a$, $Y_b$, $Y_c$=the position of the balance motor when the system is balanced at calibration positions a, b, and c, respectively;

FIG. 12 is a flow chart of an exemplary process 200 for calibrating and using the system. In this example, calibration positions a, b, and c have been selected to simplify solving for the constants $m_1$, $m_2$ and b. In this example, calibrations positions a, b, and c are as follows:
    Position a→$X_1$=0 and $X_2$=0
    Position b→$X_1$=0 and $X_2$=$X_{2\text{-}MAX}$
    Position c→$X_1$=$X_{1\text{-}MAX}$ and $X2$=0

Choosing positions at the maximum the motor can travel yields greater precision from the system.

At 220, the system may set to calibration position a. The position $X_1$ of the convergence motor and the position $X_2$ of the interocular motor may be both set to zero. Physically, the control system may drive the interocular spacing and convergence angle motors to their zero position. An operator may then manually control balance motor 162 with a knob or other controller and set the balance motor to a position $Y_a$ that balances the system. With $X_1$=0 and $X_2$=0, equation (5) becomes $$Y_a = b \quad (6)$$

Once the system is balanced, the operator may press a balance button to tell the system that it is balanced. The system stores the information in memory.

At 230, the system may be calibrated at calibration position b. The position $X_1$ of the convergence motor may remain at zero and the position $X_{2b}$ of the interocular motor may be set to a maximum value or other non-zero value. The operator may then manually control balance motor 162 with the knob or other controller and set the balance motor to a position $Y_b$ that balances the system.

With the system balanced and $X_1$=0, equation (5) becomes:

$$Y_b = m_2 X_{2b} + b \quad (7)$$

Solving for $m_2$ at position b:

$$m_2 = (Y_b - b)/X_2 \quad (8)$$

Once balanced, the user presses the balance button to tell the system that it is balanced. The system also stores this information in memory.

At 230, the system may be calibrated at calibration position c. The position $X_{1c}$ of the convergence motor may be set to a maximum value or other non-zero value. The position $X_{2c}$ of the interocular motor may be set zero. The operator may then manually control balance motor 162 with the knob or other controller and set the balance motor to a position $Y_c$ that balances the system.

With the system balanced and $X_2$=0, equation (5) becomes:

$$Y_c = m_1 X_{1c} + b \quad (9)$$

Solving for $m_2$ at position b $$m_1 = (Y_c - b)/X_1 \quad (10)$$

Once balanced, the user presses the balance button so that the control system knows that the entire system is balanced. The system stores the information in memory. At this point, the control system knows the three constants and the balance knob is no longer controlling the motor.

At 250, the system may be used to film a scene or scenes, using equation (5) to maintain the system balance as the interocular spacing and/or the convergence angle are changed. Whenever the convergence motor or interocular motor changes position, the balance motor position is updated. When a physical change in the system is made at 260, the process 200 may return to 220 for recalibration.

The constants $m_1$, $m_2$ and b are saved in non-volatile memory. The system must be re-calibrated whenever the system undergoes any physical changes, even something as simple as dressing a cable. Certainly, major changes such as changing the camera or lenses require recalibration.

The exemplary embodiment update convergence and interocular motor positions every 5-10 ms. The balance motor is updated every 10-20 ms. A small amount of latency is tolerated.

Note that calibration assumes that rotation movement of camera 22 (or any other camera) for changing the convergence angle is somewhat linear. That assumption simplifies the calculations. Using this assumption does not cause significant errors because changes to the convergence angle are generally small, usually less than 3° or 4°.

Using a tilt sensor would automate the three-point balancing and allow the system to self-calibrate. A "tilt sensor" is a 2-axis accelerometer that measures the direction of gravitational acceleration and generates a tilt angle. A tilt sensor could actively balance the system. This would eliminate the need for calibration, but a PID closed loop control would have to be set up to maintain balance.

The description is illustrative and not limiting and is by way of example only. Although this application shows and describes examples those having ordinary skill in the art will find it apparent that changes, modifications or alterations may be made. Although many of the examples involve specific combinations of method acts or system elements, those acts and those elements may be combined in other ways to accomplish the same objectives. With regard to flowcharts, additional and fewer steps may be taken, and the steps as shown may be combined or further refined to achieve the methods described. Acts, elements and features discussed only in connection with one embodiment are not intended to be excluded from a similar role in other embodiments.

"Plurality" means two or more. A "set" of items may include one or more of such items. The terms "comprising," "including," "carrying," "having," "containing," "involving," and the like in the written description or the claims are open-ended, i.e., each means including but not limited to. Only the transitional phrases "consisting of" and "consisting essentially of" are closed or semi-closed transitional phrases with respect to claims. The ordinal terms such as "first," "second," "third," etc., in the claims to modify a claim element do not by themselves connote any priority, precedence, or order of one claim element over another or the temporal order in which acts of a method are performed. Instead, they are used merely as labels to distinguish one claim element having a certain name from another element having a same name (but for use of the ordinal term). Alternatives such as "or" include any combination of the listed items.

I claim:

1. A portable camera transport system comprising:
an upright support having a longitudinal axis and two ends;
a camera support mounted to one end of the upright support for receiving a stereographic camera including first and second cameras, an interocular motor to set an interocular distance between the first camera and the second camera, and a convergence motor to set a convergence angle between the first camera and the second camera;
a ballast mounted to the other end of the upright support;
a balance mechanism for automatically moving the camera support generally perpendicular to the longitudinal axis relative to the ballast, the balance mechanism comprising a balance plate and a balance housing moveable relative to each other, a balance motor in the balance housing engaging the balance plate for positioning the balance plate relative to the balance housing; and
a control system to control the balance motor to position the balance plate relative to the balance housing using the following equation:

$Y=m_1 X_1 + m_2 X_2 + b$, wherein

Y=a position of the balance motor,
$m_1$=a predetermined Convergence Factor,
$m_2$=a predetermined Interocular Factor,
$X_1$=a position of the convergence motor,
$X_2$=a position of the interocular motor,
b= a predetermined Offset.

2. The system of claim 1 wherein one end of the upright support attaches to the balance mechanism.

3. The system of claim 1 further comprising an upright support fitting receiving the upright support, and balance plate having openings for attaching the upright support fitting at one of a plurality of positions on the balance plate.

4. The system of claim 1 wherein the balance mechanism further comprises at least one rail receiving channel and at least one rail opposed to the at least one rail receiving channel, each rail receiving channel receiving a rail for movement of the rail relative to the rail receiving channel.

5. A method of operating a camera system, wherein the camera system includes an upright support having a longitudinal axis and two ends, a camera support mounted to one end of the upright support, a stereographic camera including first and second cameras mounted to the camera support, a ballast mounted to the other end of the upright support, and a balance mechanism for automatically moving the camera support generally perpendicular to the longitudinal axis relative to the ballast, the balance mechanism comprising a balance plate and a balance housing moveable relative to each other, a balance motor in the balance housing engaging the balance plate for positioning the balance plate relative to the balance housing, the method comprising:
setting an interocular distance between the first and second cameras using an interocular distance motor;
setting a convergence angle between the first and second cameras using a convergence motor; and
controlling the balance motor to position the balance plate relative to the balance housing using the following equation:

$Y=m_1 X_1 + m_2 X_2 + b$, wherein

Y=a position of the balance motor,
$m_1$=a predetermined Convergence Factor,
$m_2$=a predetermined Interocular Factor,
$X_1$=a position of the convergence motor,
$X_2$=a position of the interocular motor,
b=a predetermined Offset.

* * * * *